Nov. 19, 1935.   J. G. BLUNT   2,021,167
HOUSING AND END THRUST BEARING DEVICE FOR RAILWAY VEHICLE AXLES
Filed Feb. 2, 1934
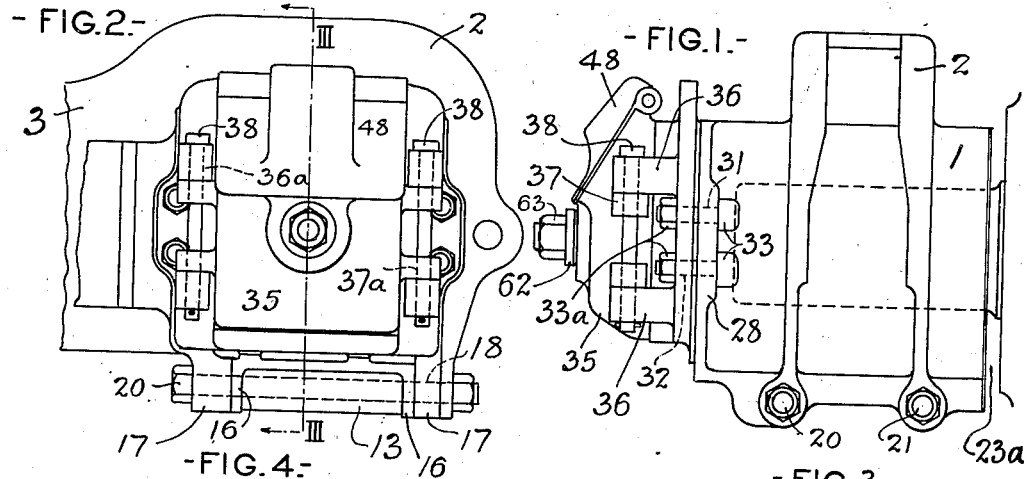
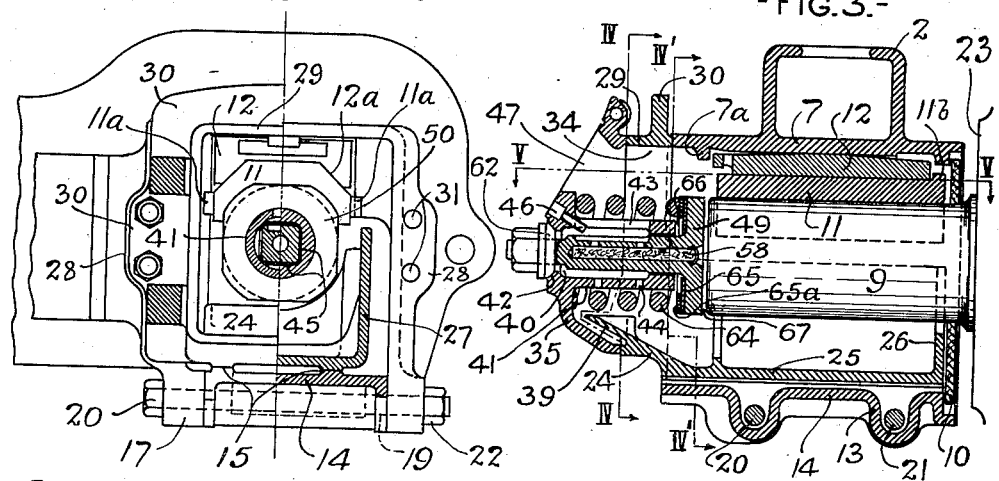
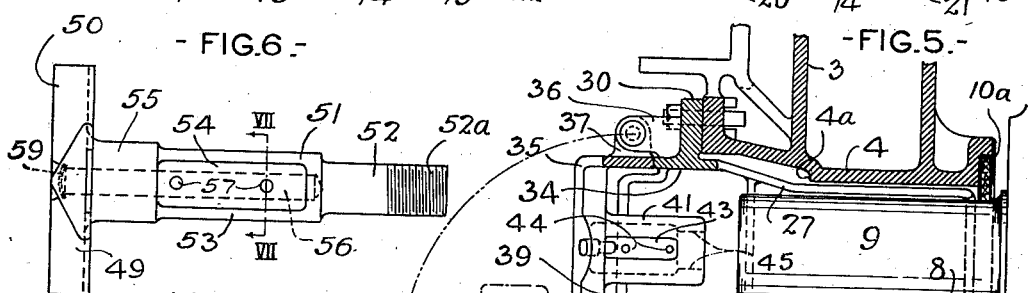
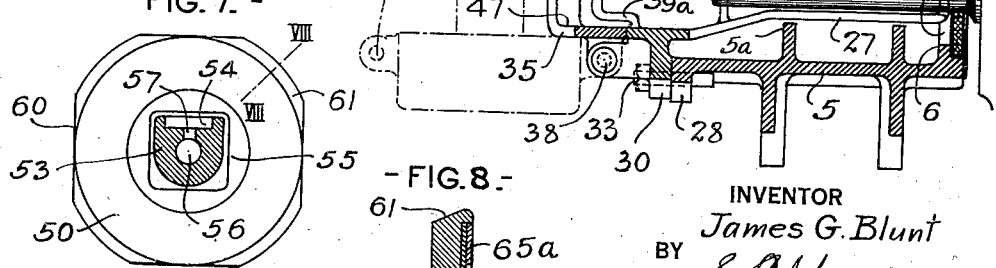
INVENTOR
James G. Blunt
BY
S. C. Yeaton
ATTORNEY Patented Nov. 19, 1935

2,021,167

UNITED STATES PATENT OFFICE 2,021,167

HOUSING AND END THRUST BEARING DEVICE FOR RAILWAY VEHICLE AXLES

James G. Blunt, Schenectady, N. Y., assignor to American Locomotive Company, New York, N. Y., a corporation of New York Application February 2, 1934, Serial No. 709,451

6 Claims. (Cl. 308—41)

This invention relates to a housing and end thrust bearing device for an axle of a railway vehicle.

An object of the invention is to provide an improved device embodying a housing for an axle of a railway vehicle and an end thrust bearing for the axle disposed within the housing.

A further object is to provide an improved device of the character described embodying means whereby the thrust bearing will be insured constant adequate lubrication.

A further object is to provide a device of the character described wherein the thrust bearing is adapted to limit outward lateral movement of the axle to a predetermined amount thereby eliminating the necessity for a wear plate for the adjacent wheel hub and to offer resistance to said movement.

A further object is to provide a device of the character described wherein the thrust bearing is carried by an outer end cover of the housing.

A further object is to provide a device of the character last described wherein the cover is hingedly connected relative to the housing adapting it for hinged movement, together with the thrust bearing, to closed and open positions.

A further object is to provide a device of the character described embodying a lubricant cellar for the housing removably connected therewith and an end cover for the housing, with the cover and the thrust bearing for the axle carried by the cellar.

A further object is to provide a device of the character described wherein the thrust bearing is supported by an outer end cover for the housing hingedly connected relative thereto, adapting the thrust bearing to be swung away from the axle without disturbing the relationship of the axle and the housing, facilitating adjustment, replacement or repairs of the thrust bearing or main journal bearing and enabling convenient packing of the journal lubricant.

A further object is to provide a device of the character last described wherein the cover is provided with a lidded opening which opening affords access to the interior of the housing without disturbing the thrust bearing.

A further object is to provide a device of the character described embodying a lubricant cellar for the housing and a cover for the outer end of the housing, with the cover, the thrust bearing and the cellar assembled as a unit and adapted to be installed in and removed from the housing as a unit.

A further object is to provide an axle housing, a cover for an end of the housing and a removable lubricant cellar for the housing, with the cover carried by the cellar.

A further object is to provide a housing for an axle and end thrust bearing means for the axle hingedly connected with the housing for swinging movement away from the normal working position thereof and including a resistingly movable bearing member, automatically operable means for maintaining alignment of the bearing member with the axle throughout the range of the resisting movement thereof, and further automatically operable means for assisting in returning the bearing member to normal central alignment when it is being returned to its normal position after resisting movement therefrom.

Other and further objects of and advantages achieved by the invention will be apparent from the following description of an approved embodiment thereof and the appended claims.

In the accompanying drawing Figure 1 is a side view of an axle housing or box embodying the present invention, the housing being formed integrally with a frame member; Fig. 2 is a front end view of the box shown in Fig. 1 with the frame member shown fragmentally; Fig. 3 is a section on the line III—III of Fig. 2; Fig. 4 at the left side is a section on the line IV—IV of Fig. 3, and at the right side is a section on the line IV'—IV' of Fig. 3; Fig. 5 is a section on the line V—V of Fig. 3, with certain parts removed, the journal box cover being indicated by broken lines in its open position; Fig. 6 is an enlarged plan view of the plunger shown in Fig. 3; Fig. 7 is a section on the line VII—VII of Fig. 6; and Fig. 8 is a fragmental section on the line VIII—VIII of Fig. 7.

The device of the present invention comprises an axle journal housing or box indicated generally by the numeral 1, which housing is formed integral with an end portion 2 of a railway vehicle side frame member 3.

The housing comprises side walls 4 and 5, a rear end wall 6 and a top wall 7. An opening 8 is formed in the wall 6 through which an axle journal 9 extends into the housing. A dust guard 10 is secured over the opening 8, around the journal, a suitable securing plate 10a being provided for holding the guard in position.

A journal bearing 11 and a bevelled topped journal bearing wedge 12 are provided between the upper wall 7 of the housing and the top of the journal. A longitudinal groove 12a is formed in the bottom of the wedge and the upper face of the bearing is shaped to fit within the groove.

Projections 11a are formed near the front end of the bearing and engage shoulders 4a and 5a formed on the side walls of the housing, the bearing being thus held against inward movement.
A downwardly projecting lug 7a is formed on the upper wall 7 of the housing adjacent the outer end of the wedge, the wedge being thus held against outward movement. An upwardly extending flange 11b is formed on the rear end of the bearing engaging the rear end of the wedge, thus preventing outward movement of the bearing and inward movment of the wedge.

A spreader 13 is provided at the bottom of the housing between the side walls 4 and 5. The spreader 13 includes a horizontal wall 14, having raised seats 15 formed thereon for slidably supporting a cellar hereinafter described, and downwardly extending side flanges 16. Two spaced lugs 17 are formed on each of the opposite side walls 4 and 5 at the bottoms thereof. A bolt hole 18 is formed in each lug 17. Corresponding bolt holes 19 are formed in each side flange 16, one hole 19 adjacent each hole 18. The holes 18 and 19 at the front end portion of the housing and of the spreader are in alignment with each other and a bolt 20 is passed therethrough. Similarly the holes 18 and 19 at the rear end portion of the housing and of the spreader are in alignment with each other and a bolt 21 is passed therethrough. Nuts 22 are provided on the ends of the bolts 20 and 21. The wall 14 is curved at its front and rear portions and passes downwardly around the respective bolts 20 and 21 (see Fig. 3).

All of the aforedescribed structure is substantially of the usual well known design.

The cellar 24 is disposed within the journal housing. The cellar comprises a bottom wall 25 which rests on the seats 15, and a rear end wall 26 and side walls 27 which extend upwardly from the bottom wall to approximately the horizontal center plane of the journal, the wall 26 being shaped at its upper edge to conform to the journal. The walls 27 flare at the front portions thereof and the bottom wall 25 is correspondingly shaped providing increased space within the cellar at the outer end of the journal.

The front end of the journal housing is open and outwardly extending flanges 28 are formed at the front ends of the walls 4 and 5. The front ends of the walls 27 of the cellar extend outwardly beyond the front ends of the walls 4 and 5. The front end of the bottom wall 25 of the cellar also extends beyond the front end of the spreader 13 and slants upwardly. A top wall 29 is provided for the cellar between the side walls 27 above the upwardly slanting end portion of the bottom wall across the extended portions of the walls 27. An outwardly extending flange 30 is formed on the front end portion of the side walls 27 and the top wall 29 of the cellar. The flange 30 bears at its side portions against the flanges 28. Coinciding bolt holes 31 and 32 are formed in the flanges 28 and 30 respectively, two at each side of the housing. Bolts 33 are passed through the respective adjacent holes 31 and 32 and nuts 33a are provided on the ends of the bolts 33, the cellar being thus secured to the box. The cellar thus provides an opening 34, which is spaced from the end of the journal, for a plunger and its associated parts hereinafter described.

The front end of the cellar provides a frame for securing a cover 35 thereto which is provided for the opening 34. The cover comprises a box-shaped structure, the rear edges of which coincide with the front edges of the cellar when the cover is in closed position. Lugs 36 are integrally formed on the flange 30 and extend forwardly, two at each of the opposite sides of the cover. Corresponding lugs 37 are integrally formed on the sides of the cover 35 and extend outwardly therefrom, two on each side, between the two lugs 36 on their respective sides. Pin holes 36a and 37a are formed in the lugs 36 and 37 respectively, the holes 36a and 37a on the respective sides of the cover and cellar being in alignment, and pins 38 are vertically passed through these holes. The upper ends of the pins are suitably headed, and cotters are provided in the lower ends thereof, the cover being thus secured to the cellar over the opening 34. By removing either one of the pins 38 the cover may be hingedly swung about the axis of the other pin 38, as illustrated in Fig. 5.

At the front end of the upwardly slanting front end portion of the wall 25 a forwardly extended lip 39 is formed. The bottom portion of the cover 35 slants correspondingly to the front end of the wall 25 and when the cover is in closed position the lip 39 extends over the joint of the adjacent bottom edges of the cover and cellar. The side walls 27 of the cellar at their front end portions are connected with the lip 39 by vertical walls 39a (see Fig. 5). It will thus be apparent that oil may be retained in the cellar at a level higher than the adjacent lower edges of the cover and cellar without possible leakage between these edges.

An opening 40 is formed centrally in the cover 35 and a sleeve 41 is formed on the inner or rear side of the cover and extends rearwardly from the edges of the opening 40. The edge of the opening 40 at the front face of the cover is shaped to provide a ball seat 42 for a purpose hereinafter described. A slot 43 is provided in the top of the sleeve and drip holes 44 are provided in the bottom of the sleeve. At the inner end of the sleeve its interior is square-shaped providing a bearing seat indicated at 45 (see Fig. 4).

Above the opening 40 an oil passage 46 is provided through the cover, the passage 46 opening into the slot 43 of the sleeve, thus permitting oil to be directly supplied to the interior of the sleeve from outside the housing.

In the upper portion of the cover 35 a square opening 47 is formed and a lid 48 is hingedly secured over the opening 47. The lid 48 and its hinge are of the usual well known journal box lid and hinge design.

A plunger indicated generally by the numeral 49 is provided opposite the outer end of the journal. The plunger comprises a substantially circular bearing plate 50 disposed adjacent the outer end of the journal and a stem 51 which extends forwardly from the plate through the sleeve 41 and the opening 40 to the outside of the cover. The front end portion 52 of the stem 51 is round and is threaded as indicated at 52a. The central portion 53 of the stem is U-shaped in cross section, a longitudinal groove 54 being formed in its upper surface, registering with the slot 43 formed in the top of the sleeve. The central portion 53 of the stem is joined to the plate 50 by a portion 55 which is square in cross section and is disposed within the square bearing seat 45 of the sleeve. A hole or passage 56 is formed through the plate 50 and through the portions 55 and 53 of the stem. Radial holes 57 connect the passage 56 with the groove 54 in the stem portion 53. A suitable lubricant wick 58 is disposed in the passage 56 and a perforated cap 59 is fitted in the rear end thereof (in the plate 50) for holding the wick in place. The edges of the plate 50 are cut away as indicated at 60 and are bevelled as indicated at 61.

A ball-faced seating 62 is disposed around the end portion 52 of the stem 51 and normally rests upon the seat 42. A nut 63 is provided on the front end of the stem adjacent the outer surface of the seating 62. With any spring resisting movement of the plunger a universal movement is provided for the stem at its rear end by a slight amount of play which is permitted between the portion 55 and the seat 45, thus permitting the plunger to adjust itself to various angularities of the journal which are permitted by the curved upper surface of the wedge 12, so that the oppositely disposed bearing surfaces of the plate 50 and the journal will be in full surface engagement in all of the angular positions of the journal. The seating 62 cooperates with the seat 42 to provide a socket connection for the front end of the stem so that when the plunger is returned to normal position after movement therefrom, the front end of the stem will be automatically returned to its normal central position for proper alignment of the stem with the axle.

A helical spring 64 is disposed around the sleeve. The spring bears at its front end against the cover 35 and at its rear end against the plate 50. Washers 65 and 65a however are disposed between the rear end of the spring and the plate 50. The washer 65 has an inside diameter slightly larger than the diameter of the stem portion 55, so that this washer extends between the plate 50 and the rear end of the sleeve. The inside diameter of the washer 65a is the same as the inside diameter of the spring so that it does not extend between the plate and the rear end of the sleeve.

In normal position the spring will hold the plunger at its innermost or rearwardmost position as shown in Fig. 3. In this normal position there will be space indicated at 66 between the plate (or more particularly the washer 65) and the inner end of the sleeve. In the normal lateral position the outer end of the journal will be slightly spaced from the plate 50 as indicated at 67. When the axle journal moves laterally in the direction of and engages the plate 50, it will provide an end thrust bearing therefor. By virtue of the spring the plunger will act to yieldingly resist this lateral movement of the journal and aid in returning it to its normal position relative to the housing. The outward lateral movement from normal permitted the journal will be limited by the amounts of space indicated at 66 and 67, that is to say when the plunger has been forced outwardly to a position where the plate 50 (i. e. the washer 65) bears against the rear end of the sleeve further outward lateral movement of the journal will be prevented.

By employing washers of different thicknesses in place of the washer 65a variations of the spring load on the plunger may be made without altering the range of lateral movement of the plunger. By employing washers of different thicknesses in place of the washer 65 both the spring load and the range of lateral movement of the plunger may be varied. Further in place of the two washers 65 and 65a a suitable step washer may be employed and step washers having steps of different thicknesses may be substituted therefor in order to effect variances in either or both of the spring load and range of plunger lateral movement as desired. Also a washer may be employed, either separately in place of both washers 65 and 65a or with the washer 65 in place of the washer 65a, which has an inside diameter slightly larger than the diameter of the stem portion 55 and an outside diameter less than the inside diameter of the spring, so that it extends between the plate 50 and the end of the sleeve but not between the spring and the end of the sleeve. By employing washers of different thicknesses in place of this washer the range of lateral movement of the plunger may be varied without affecting the spring load. By suitably adjusting the nut 63 the amount of space at 67 between the journal end and the plate 50 may be varied as desired.

The wick 58 in the passage 56 of the stem aids in the proper transmission of lubricant therethrough to the adjacent surfaces of the plate and journal end. The lubricant may be supplied through either the passage 46 or the opening 47 and it will pass through the slot 43, the groove 54, hole 57 and passage 56 as aforedescribed. Any excess lubricant supplied to the sleeve will pass through the holes 44 into the bottom of the cellar, the lip 39 extending below these holes. By virtue of the cellar being widened at its front end, when the lid 48 is open, free access will be permitted to the packing at the bottom of the cellar which will be supplied in the usual manner.

As the plunger, its associated parts and the cover are formed as a unit, it will be apparent that this structure will all be moved simultaneously away from the end of the axle when the cover is swung about one or the other of the pins 38 to open position as hereinbefore described. Thus the journal need not be disturbed when it is desired to repair or adjust the plunger or its associated parts.

It will be apparent that the cellar 24, the cover 35, and the plunger 49 and its associated parts are secured together as a unit so that by removal of the nuts 33a this unit may be removed from the housing, and likewise may be installed in the housing.

When the journal 9 is in its normal lateral position relative to the housing, its adjacent wheel hub, indicated at 23, will be spaced from the journal housing, as indicated at 23a, a predetermined amount. It will be understood that the invention contemplates a device with the associated parts suitably proportioned and arranged so that the space 23a is of greater width than the combined widths of the spaces 66 and 67. Thus the outward lateral movement of the journal will be arrested (when the sleeve 41 arrests the outward movement of the plate 50) before the hub of the wheel comes in contact with the housing, thereby obviating the use of a hub liner.

While there has been hereinbefore described an approved embodiment of this invention, it will be understood that the invention may be applied in connection with journal housings which are formed separately from the side frame members and guided in pedestal openings in said members, such as shown in Patent No. 1,875,172, issued to Alfred W. Bruce, August 30, 1932, as well as journal housings which are formed integral with side frames and that various other changes and modifications in form, arrangement of parts and details of construction may be made without departing from the spirit of the invention and that all such changes and modifications as fall within the scope of the appended claims are contemplated as a part of this invention.

I claim:

1. In a railway vehicle, a wheeled axle; a housing for an end portion of said axle open at its end adjacent the outer end of said axle end portion; a cover for closing said open end having an opening in its upper portion; a hinged lid for closing said cover opening; means hingedly connecting said cover relative to said housing to permit said cover to be swung to open and closed positions; means for holding said cover in closed position; an end thrust axle bearing comprising a plunger having a head portion adjacent the outer end of said axle end portion and a hollow stem connected to said head portion and supported by said cover, said head portion being provided with an opening in communication with the hollow portion of said stem; and an auxiliary opening in said cover below the first said cover opening and above said bearing stem, said auxiliary opening providing an independent oil passage leading from the outside of said housing to said stem and said stem having an opening providing communication between its hollow portion and said auxiliary opening for receiving oil supplied through said passage.

2. In a railway vehicle, a wheeled axle having an end journal; a housing for said journal open at its end adjacent the outer end of said journal; a lubricant cellar detachably secured in said housing; a cover for closing said open end of said housing hingedly connected to said cellar to permit said cover to be swung to open and closed positions, the lower portion of said cover engaging a portion of said cellar when said cover is in closed position; a lip formed on said engaging cellar portion extending over the engaged parts of said engaging cover and cellar portions when said cover is in closed position; means for holding said cover in closed position; and end thrust axle bearing means for said outer end of said journal supported by said cover interiorly thereof above said lip.

3. In a railway vehicle, a wheeled axle having an end journal; a housing for said journal open at its end adjacent the outer end of said journal; a lubricant cellar detachably secured in said housing comprising a bottom wall, side walls, a rear end wall, a front end wall having an upwardly extending lip formed thereon, and means connecting said side walls with said lip; a cover for closing said open end of said housing hingedly connected therewith to permit said cover to be swung to open and closed positions, a lower part of said cover engaging a part of said front end wall when said cover is in closed position with said lip extending over said engaged parts, said means connecting said side walls with said lip and said lip permitting lubricant to be retained in said cellar at a level above said engaged parts; means for holding said cover in closed position; and an end thrust axle bearing disposed opposite said outer end of said journal and supported by said cover interiorly thereof above said lip.

4. In a railway vehicle, a wheeled axle; a housing for an end portion of said axle; wedge and bearing means disposed between said axle at the top thereof and said housing, said housing being open at its outer end adjacent the outer end of said axle end portion; a cover for closing said open housing end having an opening in its upper portion opposite said wedge and bearing means permitting access to the interior of said housing when said cover is in closed position; a hinged lid for closing said cover opening; means hingedly connecting said cover relative to said housing to permit said cover to be swung to open and closed positions; means for holding said cover in closed position; and end thrust axle bearing means for said outer end of said axle end portion carried by said cover interiorly thereof beneath said cover opening.

5. In a railway vehicle, an axle having a journal at an end thereof; a housing for said journal adapting said axle at said end for lateral outward and tilting movements from its normal position relative to said housing, said housing being open at its outer end; a lubricant cellar detachably secured in said housing against movement relative thereto; and end thrust bearing means comprising a mounting including a cover for closing said open end, a bearing member having a face opposite the end face of said axle end, said member face being adapted for engagement around its peripheral margin with said axle face, said member being adapted for lateral outward and tilting movements from its normal position relative to its said mounting by said axle end when said axle end moves correspondingly, means for resisting said movements of said member and for maintaining said engagement throughout said movements of said member to thereby resist said outward movement of said axle end, means hingedly connecting said cover to said cellar to permit said bearing means to be swung relative to said cellar from and to its normal position, and means for holding said cover against movement relative to said cellar when said bearing means is in its said normal position, said bearing means and cellar being installable into and removable from said housing as a unit.

6. In a railway vehicle, an axle having a journal at an end thereof; a housing for said journal adapting said axle at said end for lateral outward and tilting movements from its normal position relative to said housing, said housing being open at its outer end; a lubricant cellar secured in said housing against movement relative thereto; and end thrust bearing means comprising a mounting including a cover for closing said open end, a bearing member supported by said mounting having a face opposite the end face of said axle end, said member face being adapted for engagement around its peripheral margin with said axle face, said member being adapted for lateral outward and tilting movements from its normal position, relative to its said mounting, by said axle end when said axle end moves correspondingly, means for resisting said movements of said member and for maintaining said engagement throughout said movements of said member to thereby resist said outward movement of said axle end, said cover having an opening above said bearing member, a hinged lid for closing said cover opening, means hingedly connecting said cover with said cellar to permit said bearing means to be swung relative to said cellar from and to its normal position, and means for holding said cover against movement relative to said cellar when said bearing means is in its said normal position.

JAMES G. BLUNT.